United States Patent [19]

Tsutsumi

[11] Patent Number: 4,723,898
[45] Date of Patent: Feb. 9, 1988

[54] SMALL-SIZED AND PRECISION INJECTION MOLDING APPARATUS

[76] Inventor: Shigeru Tsutsumi, 1165 Touyama-mach, Yonezawa-shi, Yamagata-ken, Japan

[21] Appl. No.: 9,193

[22] Filed: Jan. 30, 1987

Related U.S. Application Data

[63] Continuation of Ser. No. 6,786,834, Oct. 11, 1985, abandoned.

[30] Foreign Application Priority Data

Oct. 17, 1984 [JP] Japan ................. 59-216283

[51] Int. Cl.⁴ ................ B29C 45/02; B29C 45/30
[52] U.S. Cl. ................. 425/548; 264/328.15; 264/328.16; 264/328.19; 425/549; 425/550; 425/557; 425/573; 425/588
[58] Field of Search ............ 425/542, 547, 548, 549, 425/550, 551, 557, 573, 588; 264/328.4, 328.19, 328.15, 328.16

[56] References Cited

U.S. PATENT DOCUMENTS

| | | | |
|---|---|---|---|
| 3,776,989 | 12/1973 | Annis, Jr. et al. | 264/328.19 |
| 4,438,064 | 3/1984 | Tsutsumi | 425/548 |
| 4,501,550 | 2/1985 | Nikkuni | 425/549 |

FOREIGN PATENT DOCUMENTS

| | | | |
|---|---|---|---|
| 1814764 | 6/1970 | Fed. Rep. of Germany | 425/542 |
| 96852 | 8/1976 | Japan | 425/542 |
| 89336 | 5/1983 | Japan | 425/542 |

Primary Examiner—Jay H. Woo
Assistant Examiner—Timothy W. Heitbrink
Attorney, Agent, or Firm—Louis E. Marn

[57] ABSTRACT

In a small-sized and precision injection molding apparatus, a raw material supply means, a raw material plasticization means, an injection plunger means and a melted resin flow passage means are all together incorporated in a mold, thereby a substantial distance from the raw material up to a cavity becomes shorter. Thus, an overall construction of the injection molding apparatus becomes small-size and compact.

6 Claims, 17 Drawing Figures

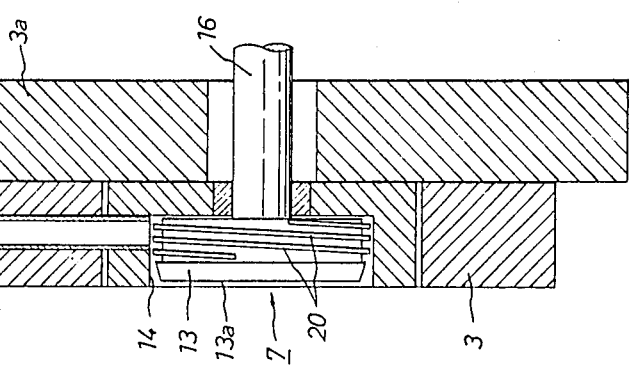
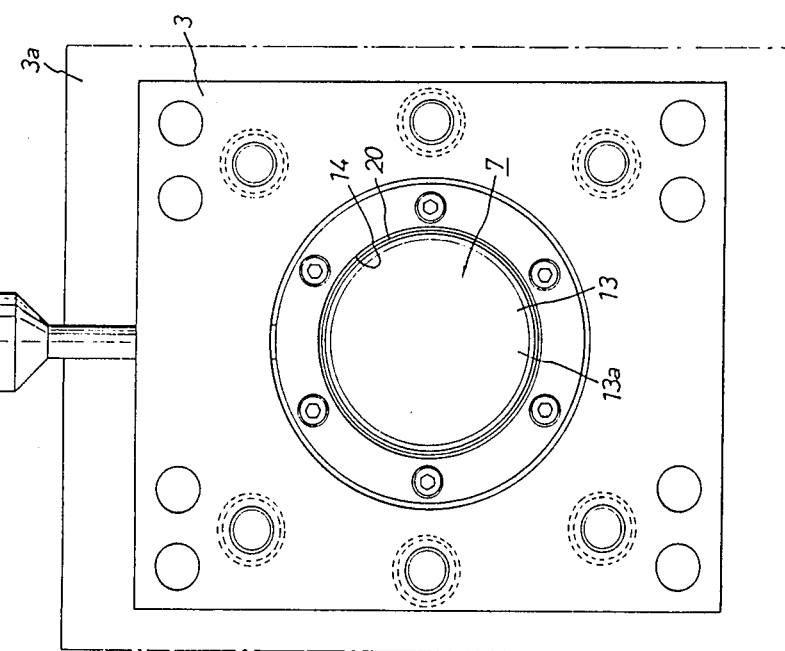

FIG. 10
FIG. 11
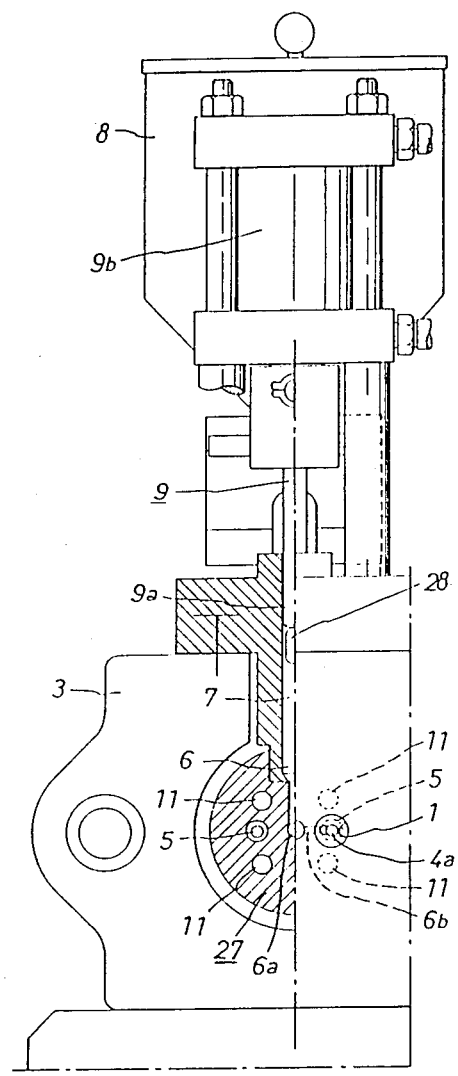
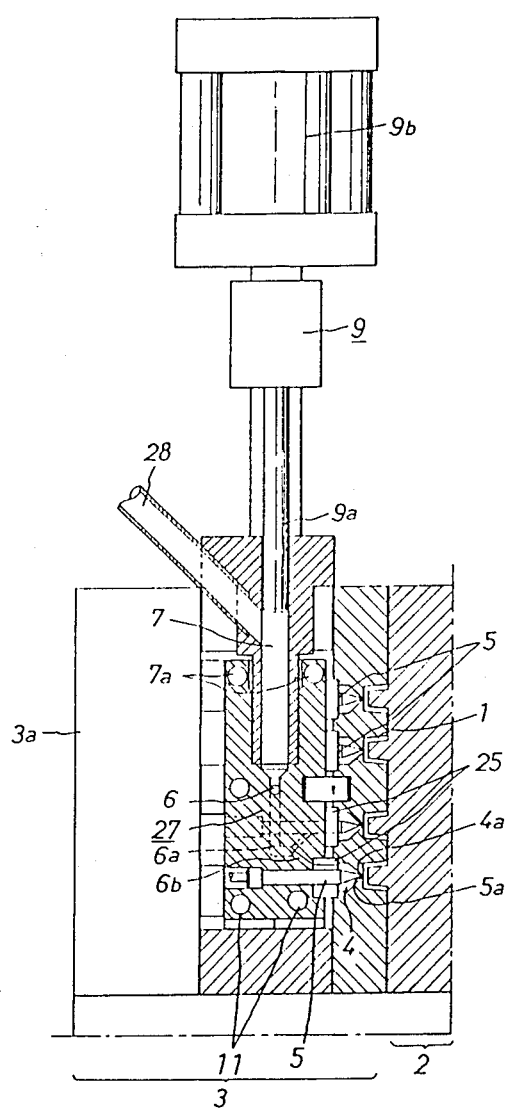

SMALL-SIZED AND PRECISION INJECTION MOLDING APPARATUS

This is a continuation of application Ser. No. 06/786,834, filed Oct. 11, 1985, now abandoned.

BACKGROUND OF THE INVENTION (1) Technical Field of the Invention

This invention relates to small-sized and precision injection molding apparatus for producing small-volumed, small-sized and high precision molded articles.

(2) Description of the Prior Art

About 60% of conventional injection molding machines are provided with large-sized clamping devices each having more or less 150 tons. However, in connection with a remarkable progress of semiconductor technology, demand for small-sized and precision molded articles is increased rapidly in electronics industry. According to a statistics of the Ministry for International Trade and Industry, Japan in 1984, about 60% of the injection molding machines are occupied by small-sized machines each having less than 100 tons. Today, a main current of electronic devices such as computers, video devices, office automation machines and their peripheral devices is to make each device more compact and smaller and simultaneously make its accuracy higher. It is foreast that such a tendency will be expedited furthermore on a global level in the future.

Despite such strong desire of electronics industry, for the time being, a basic construction of conventional large-sized injection molding machine is hardly modified, in which each section of it is small-sized partially.

In recent small-sized injection molding machines, it becomes more difficult to make compact the construction of raw material supply means, raw material plasticization means, injection plunger means, melted resin flow means or the like, although the molded articles become more compact and smaller. In addition, since a conventional injection molding machine is employed, the disadvantage is that the melted resin injected by an injection plunger is inclined to retain in a long flow passage disposed in a mold for a relatively long time before the melted resin is injected in a cavity, thereby it may be changed in quality or solidified due to cooling.

Further, such a conventional injection molding machine adopts a sprue runner system in order to carry out a precision molding, so that it is unavoidable to expend costly materials wastefully, with the molding cost being increased. In view of the aforegoing, this invention has been attained.

BRIEF SUMMARY OF THE INVENTION

It is a general object of this invention to provide a small-sized and precision injection molding apparatus, in which a raw material supply means, a raw material plasticization means, an injection plunger means and a melted resin flow passage means are all together incorporated in a mold, thereby a substantial distance from the raw material up to a cavity becomes shorter and an overall construction of the injection molding apparatus becomes small-size and compact.

Other objects and features of this invention will become apparent from the following description of embodiments with reference to the accompanying drawings.

BRIEF DESCRIPTION OF THE ACCOMPANYING DRAWINGS

FIG. 6 is a front view of a condition that a rotator in FIG. 4 is incorporated in a fixed mold.

FIG. 7 is a vertical section view of FIG. 6.

FIG. 10 is a partial sectional front view of the third embodiment.

FIG. 11 is a vertical section and side view of a fourth example, in which a plurality of cavities are disposed, thereby a large number of molded articles may be produced.

PREFERRED EMBODIMENTS OF THE INVENTION

Figures 1, 2, 3:
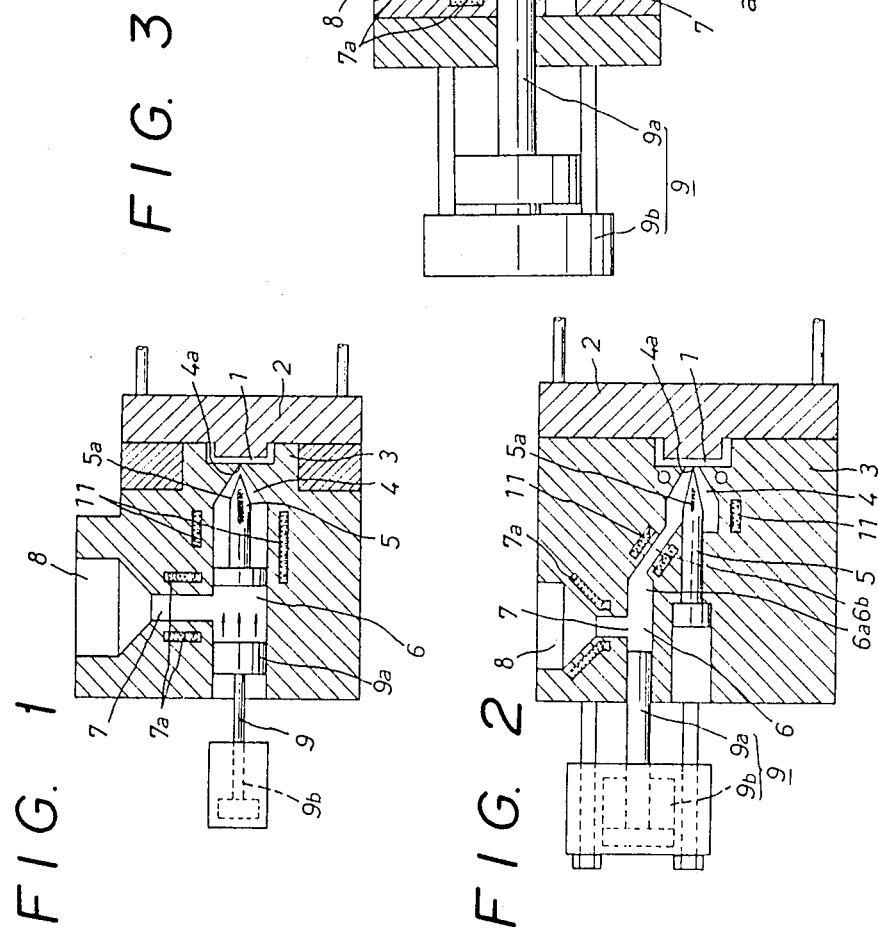
FIGS. 1 and 2 are section views of two basic constructions of a small-sized and precision injection molding apparatus of a runnerless system according to the invention.
FIG. 3 is a vertical section view of a first embodiment of the invention.

FIGS. 1 and 2 show two basic constructions of an injection molding device of a runnerless system according to this invention.

Numeral 1 is a cavity disposed between a movable mold 2 and a fixed mold 3, and the number of the cavity 1 is one or more. Numeral 4 is a heating area adjacent a gate 4a. The heating area 4 is directed to a front end 5a of a projectile pointed heating body 5 in a retaining area of the melted resin.

Numeral 6 is a melted resin flow passage means communicated with a raw material supply means 8 by way of a raw material plasticization means 7 from the heating area 4. A desired quantity of melted resin is injected in the cavity 1 by a reciprocal movement of a piston 9a of an injection plunger means 9, which is disposed in one area of the melted resin flow passage means 6.

As shown in FIG. 1, the melted resin flow passage means 6 is communicated with the heating area 4 so that the former is formed in the same axial direction as the projectile pointed heating body 5. Alternatively, as shown in FIG. 2, the former may be communicated with the latter in an oblique form toward the front end 5a of the heating body 5. Alternatively, the former may be disposed at a right angle with the front end 5a, but it is not illustrated.

Thus, the melted resin flow passage 6, the raw material plasticization means 7, the injection plunger means 9 and the raw material supply means 8 are all together incorporated within the fixed mold 3. Further, an actuator 9b of the plunger means 9a, provisional heater of the raw material supply means 8 or the raw material plasticization means 7 and the like are all disposed compactly in the proximity of the fixed mold 3.

Preferred embodiments of this invention will be described with reference to the accompanying drawings. Since the same features of construction as shown above have the same numerals in the following embodiments, their description will be omitted.

An embodiment as shown in FIG. 3 is an application of a basic construction of FIG. 2. The raw material supply means 8, the raw material plasticization means 7 and the melted resin flow passage means 6 are all together incorporated within the fixed mold 3. In addition, the piston 9a of the plunger means 9 is operable within the melted resin flow passage means 6 in the fixed mold 3. Only the actuator 9b of the plunger means 9 is moved outside the fixed mold 3. Numeral 10 is a distributing cylinder for injecting the melted resin in the flow passage means 6. It helps to expedite the melting and kneading function of the melted resin pressurized by the piston 9a and performs a role of the raw material plasticization means 7. A heat source of the raw material plasticization means 7 may be a cartridge heater 7a disposed within the fixed mold 3. Moreover, heat of the melted resin is kept by another heater 11 disposed above the distributing cylinder 10.

In FIG. 3, only one cavity 1 is shown, but, if a manifold means will be disposed within the fixed mold 3, the melted resin may be injected in a plurality of cavities by way of the manifold means.

The projectile heating body 5 may have a built-in heater therewithin in an ordinary manner. Alternatively, such a built-in heater may be formed within the front end 5a of the heating body. Thus, every time an injection molding operation is carried out, the solidified or semimelted resin in the gate area may be melted by raising the temperature of the heater. This is called the "SPEA" system developed by the present inventor, in which a runnerless injection molding process is employed.

According to this example, an integral insert means a comprising the pointed heating body 5, the raw material supply means 8, the melted resin flow passage means 6, the raw material plasticization means 7 and the plunger means 9 is compactly incorporated in the fixed mold 3. Numeral 12 is a heat insulating space formed in an insert portion of the integral insert means a. It performs the function of maintaining heat.

Referring to an operation of this example, a preferred quantity of resin pellets is supplied in the raw material supply means 8 and melted by the raw material plasticization means 7. Then, the melted or semimelted raw material is completely melted by the distributing cylinder 10 (equal to a torpedo). Then, due to a kneading function of the distributing cylinder 10 the melted resin is injected into the cavity 1 from the gate 4a by way of the heating area 4 of the pointed heating body 5.

Thus, while continuing a reciprocal operation of the injection plunger means 9, it is feasible to produce high precision small-sized molded articles continuously.

The melted resin flowing in the flow passage means 6 is constantly heated by the heater 11 as well as the built-in heater in the pointed heating body 5.

A second embodiment of this invention will be described with reference to FIGS. 4 to 8.

The second embodiment is characterized by that a rotator 13 having the Weissenberg effect is disposed in the raw material plasticization means 7 in the fixed mold 3 fixed with a die plate 3a.

The rotator 13 is disposed by way of a bearing 15 in the space 14 formed below the raw material supply means 8. A rotary shaft 16 supported by the bearing 15 is protruded from a rear part of the fixed die plate 3a, and rotated at a revolution of 80 to 600 times by way of gears 17, 18 of a driving motor 19. An outer periphery of the rotator 13 is provided with a spiral screwed portion 20, thereby the supplied raw material is extruded forward, melted rapidly in a slight gap 21 formed between a front wall 13a of the rotator 13 and the space 14 and supplied automatically into the melted resin flow passage 6.

Further, since the piston 9a of the plunger means 9 is inserted into an axial bore 22 of the rotator 13, the melted resin is injected into the cavity 1 regardless of rotation of the rotator 13.

As described previously, the pointed heating body 5 disposed in the heating area 4 of the gate 4a may be provided, at its front end, with a built-in heater, but such a built-in heater may be removed.

In connection with a mounting structure of the pointed heating body 5, the present applicant filed on Sept. 5, 1984 Japanese Patent Application No. 59-184500 entitled "A runnerless injection molding apparatus", in which the pointed heating body 5 is disposed in a manifold means 27. More specifically, a main passage 6a of the melted resin flow passage is communicated with the heating area 4 of the pointed heating body 5 by way of one or more oblique paths 6b.

Figure 4:
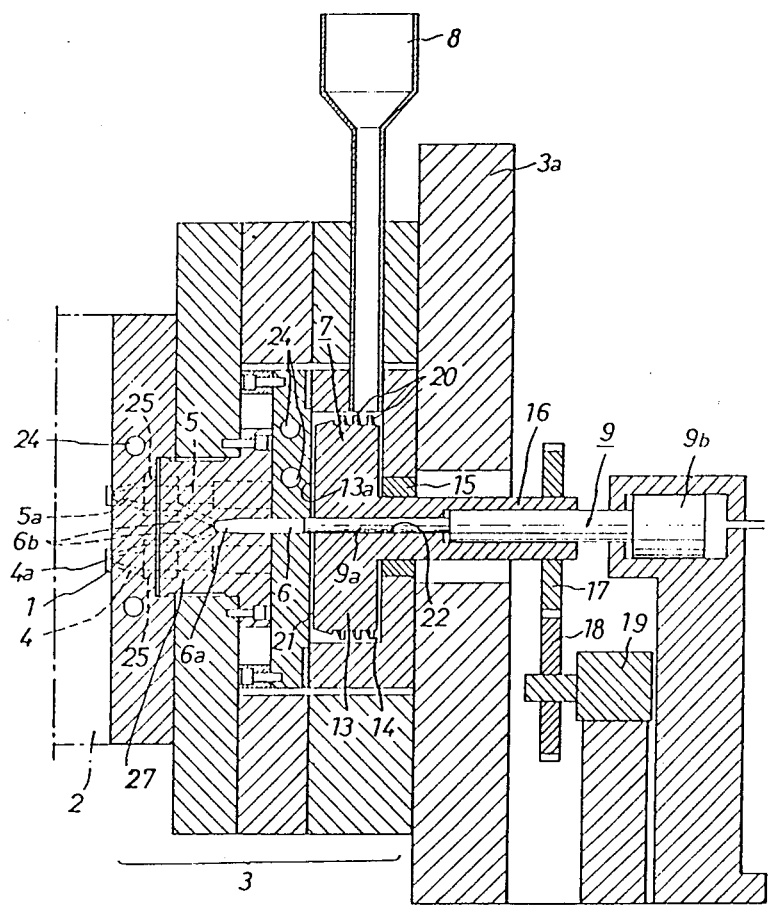
FIG. 4 is a vertical section view of a second embodiment of the invention, in which a raw material plasticization means having the Weissenberg effect is equipped.
Figure 5:
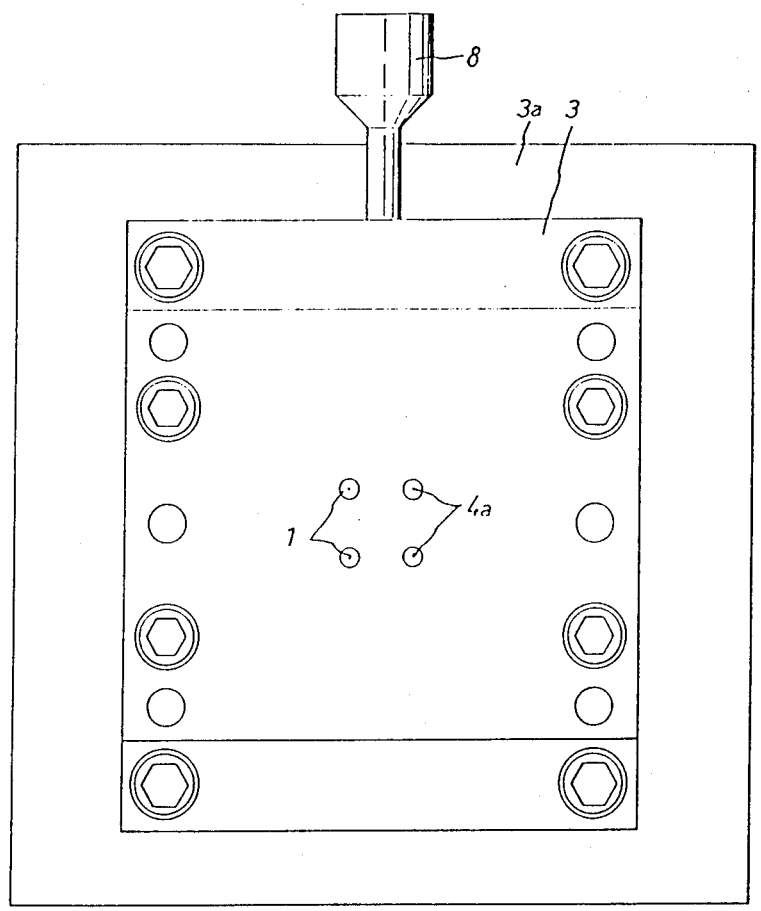
FIG. 5 is a front view seen from a cavity in FIG. 4, in which a movable mold is removed.
Figure 8:
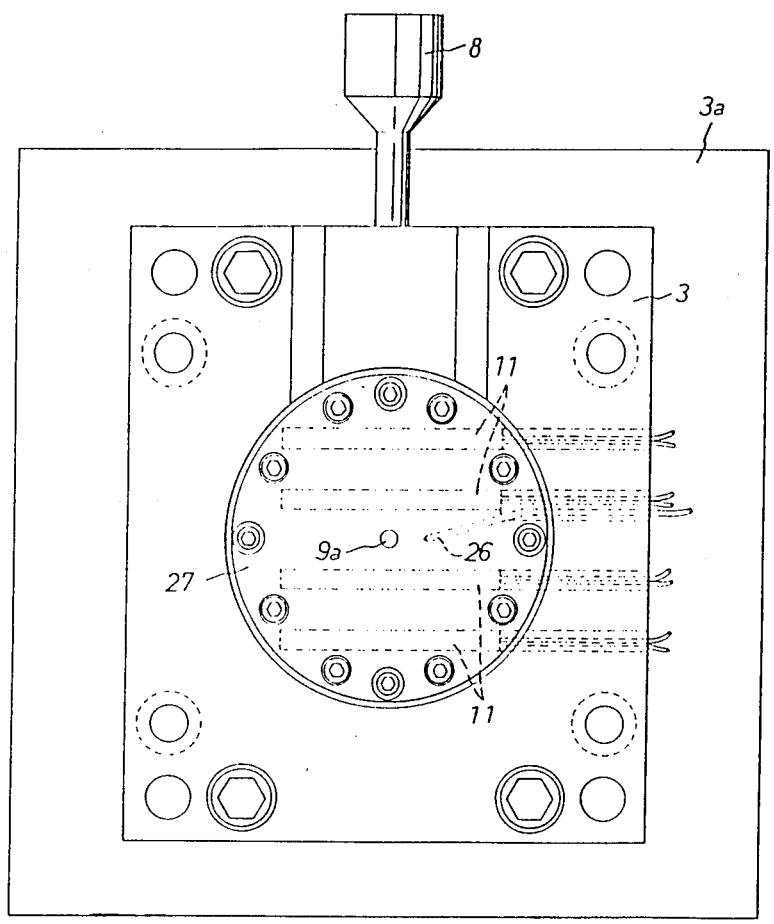
FIG. 8 is a front view of a manifold means in FIG. 4.

In FIG. 4, numeral 24 is a cooling water opening, numeral 25: a bush for preventing the melted resin from retaining, and numeral 26: a thermocouple senser.

Under such construction, the resin pellets supplied by the raw material supply means 8 are effectively melted by the raw material plasticization means 7 having the Weissenberg effect based on a high speed rotation of the rotor 13 by the driving motor 19, and the melted resin is injected into the cavity 1 by operation of the plunger means 9. Thus, high precision and small-sized molded articles are produced continuously.

A third embodiment of this invention will be described with reference to FIGS. 9 and 10.

In the aforesaid embodiments the plunger means 9 is disposed in the same direction as a moving direction of the mold 3, namely on a horizontal position relative to the fixed mold. On the other hand, the third embodiment is characterized by that the plunger means 9 stands vertically relative to the fixed mold 3, thereby the raw material supply means 8 is disposed by way of an oblique passage 28. Apart from this, the basic construction of this embodiment is substantially equal to any of the aforesaid embodiments. Since the same features of construction as shown in this embodiment have the same numerals, their description will be omitted.

The raw material supply means 8 is communicated, by way of the oblique passage 28, with the raw material plasticization means directed to the melted resin flow passage 6 disposed within the fixed mold 3. Before the raw material is heated and melted on a full scale by the heater 7a of the raw material plasticization means 7, it is provisionally heated by a spiral screwed rotor 8a and the oblique passage 28.

Likewise in this embodiment, the pointed heating body 5 is associated with the manifold 27 having the main passage 6a. The main passage 6a consists of two branch horizontal paths 6b, i.e. a leftside path and a rightside path, both of which are associated with two cavities 1, i.e. a leftside cavity and a rightside cavity respectively.

Figure 9:
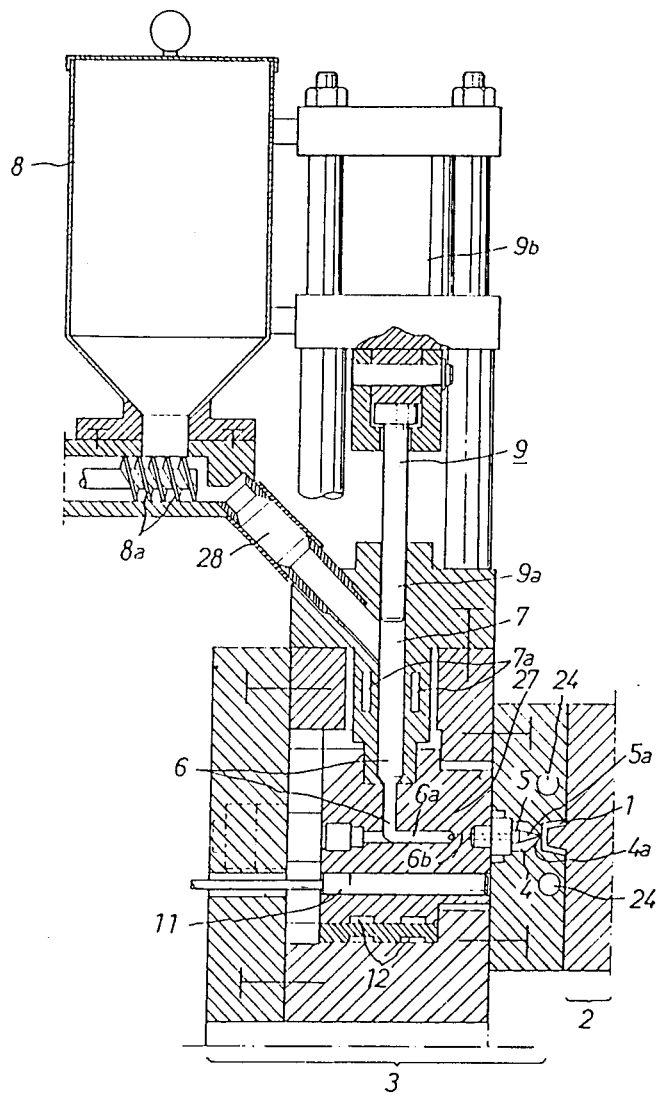
FIG. 9 is a vertical section view of a third embodiment.

As shown in FIG. 9, the melted resin flow passage 6 is formed in a L-shaped form.

According to this embodiment, the resin pellets from the raw material are supplied by way of the oblique passage 28, and then extruded vertically due to a reciprocal vertical movement of the piston 9a to be inserted at an upper part of the fixed mold 3.

Figure 12:
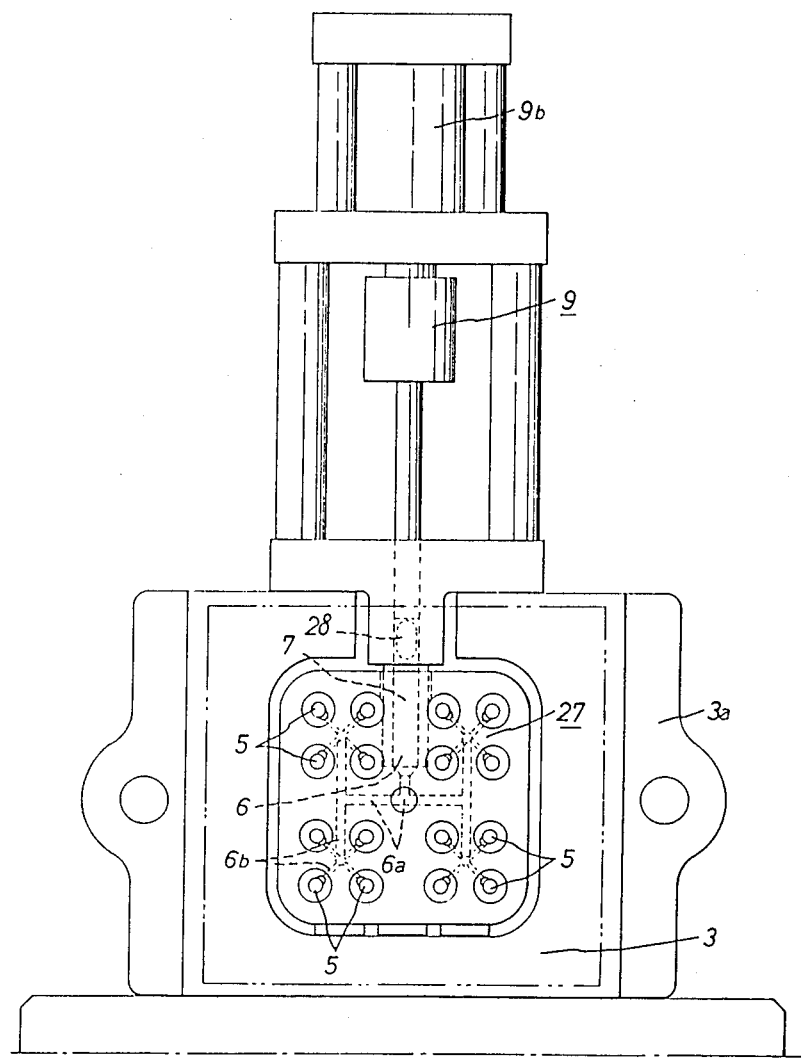
FIG. 12 is a front view seen from a pointed heating body in a fixed mold of FIG. 11.
Figure 13:
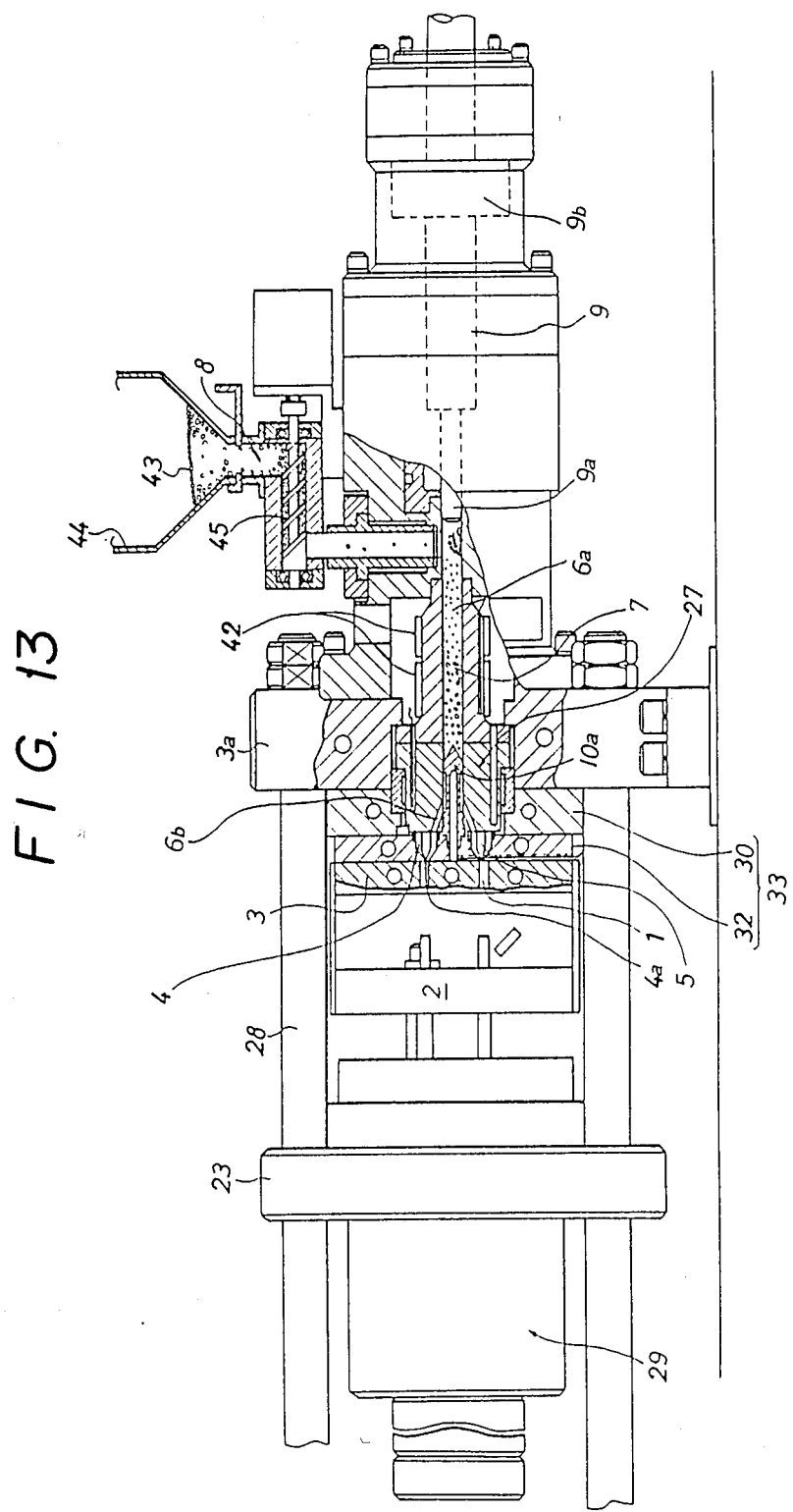
FIG. 13 is a partially cutaway section view of an overall construction of a fifth example.

A fourth embodiment of this invention will be described with reference to FIGS. 11 and 12.

A basic construction of this embodiment is substantially similar to that of the third embodiment. A remarkable aspect of the fourth embodiment is characterized by that sixteen units of the pointed heating body 5 are incorporated in the manifold means 27, so that sixteen cavities corresponding thereto are disposed in order to produce a large number of molded articles. Accordingly, description of the other construction will be omitted.

According to the fourth embodiment, every time a reciprocal operation of the injection plunger means 9 is carried out, 16 units of high precision, small sized molded articles can be produced simultaneously.

Needless to say, this invention may be applicable for a runner type injection molding apparatus.

A fifth embodiment of the invention will be described with reference to FIGS. 13 to 17.

Numeral 23 is a movable die plate which is movable along a tie bar 28. Disposed between a fixed die plate 3a and the movable die plate 23 are a fixed mold 3 and a movable mold 2. Small-sized articles can be molded in the cavity 1 formed between both molds 2, 3.

The fixed mold 3 is indirectly fixed with the fixed die plate 3a by way of a double-construction fixed back plate 33 consisting of a support plate 30 and a gate plate 32. The support plate 30 is to support and mount the manifold 27 removably on the fixed die plate 3a.

The manifold 27 is of a tubular construction, on which center axis a main passage 6a is bored. Disposed within the main passage 6a is a projectile torpedo 10a having a built-in heater 34. The main passage 6a has a plurality of oblique paths 6b, each of which is communicated with the small-volumed heating area 4 directed to the gate 31. A heat source of the heating area 4 is the pointed heating body 5 having a conical front part 5a. The pointed heating body 5 is disposed in parallel with the main passage 6a.

Figure 15:
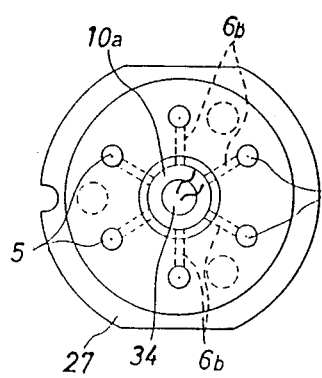
FIG. 15 is a front view of the manifold in FIG. 14.

FIG. 15 shows a front view of the manifold 27, in which six units of the pointed heating body 5 are formed symmetrically and six oblique paths 6b are extended from the main flow passage 6a. Under such construction, the melted resin is injected into six cavities by way of six gates every time an injection molding operation is carried out. Accordingly, six molded articles can be produced. From this point of view, it is possible to produce and prepare various types of manifolds, in each of which the number of the pointed heating body 5 may be set optionally. Needless to say, the number thereof must correspond to that of the cavity. Thus, a user may select a desired type of the manifold and replace with another one.

According to this embodiment, the pointed heating body is employed as an internal heating system, but it may be removed. In lieu of it, a heater (not illustrated) may be incorporated in the gate plate 32 capable of forming the heating area 4, thereby heat of the melted resin in the heating area can be kept constantly.

Further, by heating a pointed end 37 of the heating body 5 by means of the built-in heater 36, the resin solidified in the gate area can be melted every injection molding operation in order to open the gate 9 or maintain the resin in the gate area constantly under a semimelted condition. Thus, accuracy of injection molding can be enhanced furthermore.

Figure 16:
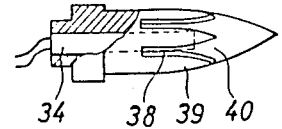
FIG. 16 is a partially cutaway section view of a torpedo disposed in the manifold in FIG. 14.
Figure 17:
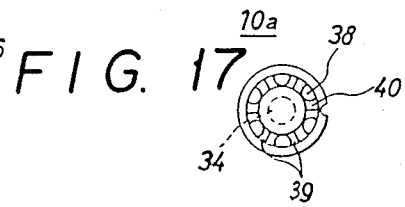
FIG. 17 is a front view of the torpedo in FIG. 16.

As described previously, mounted in the manifold 27 is the torpedo 10a having the built-in heater 34. As shown in FIG. 16, bored along the outer circumference of the torpedo are a plurality of grooves 38 corresponding to the number of the oblique paths 6b. A tapered partition 39 is formed between adjacent grooves 38, thereby an enlarged opening 40 is formed so that the resin can flow smooth into the grooves 38. If the resin within the main passage 6a is melted and kneaded sufficiently, mounting of the torpedo 10 may be omitted. However, if the manifold 27 is not provided with the torpedo 10a, it is not easy to expedite melting of the resin, so that the manifold is required to lengthen the distance of the main flow passage 6a.

Figure 14:
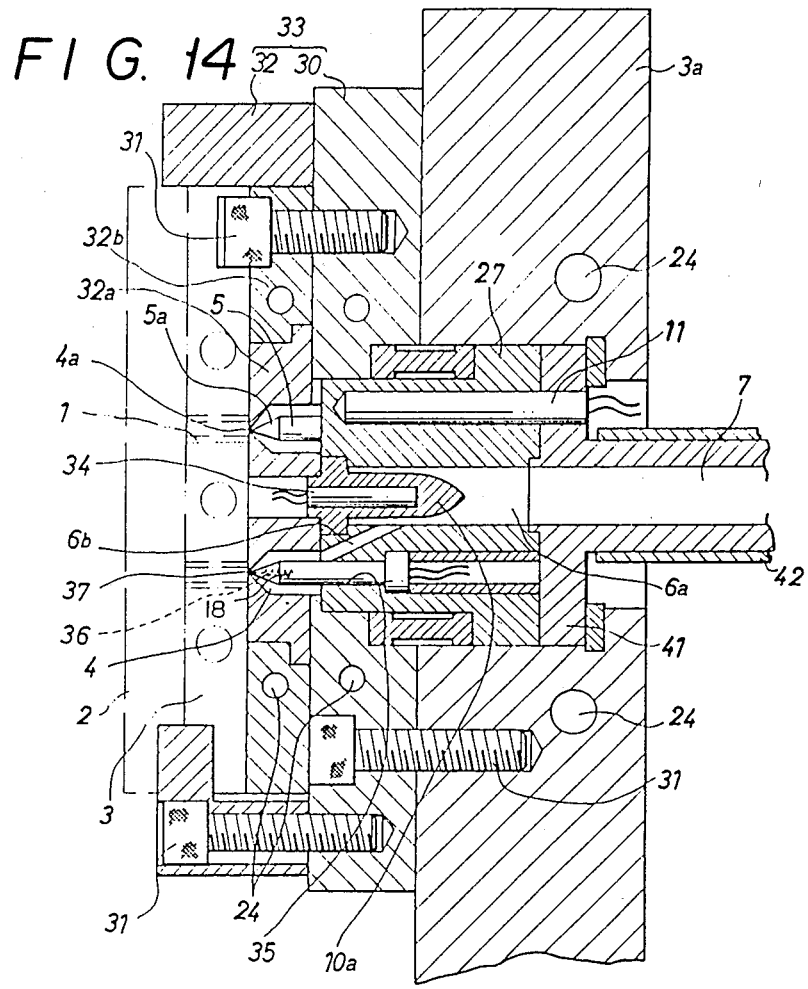
FIG. 14 is a partially expanded section view of a manifold in FIG. 13.

The main flow passage 6a is formed on a straight line. As shown in FIG. 14, a rear end of the raw material plasticization means 7 contact a front end of the manifold 27, and both components 7 and 27 are incorporated in the fixed die plate 3a. A front end of the raw material plasticization means 7 is of course connected to the injection plunger means 9 (illustrated in FIG. 13). The piston 9a of the latter is disposed on an axis of the main flow passage 6a.

The raw material plasticization means 7 is of a tubular construction having a flange 41 to be fixed with the fixed die plate 3 and a heater 42 for heating and melting the resin within the main flow passage 6a.

The raw material supply means 8 comprises a hopper 44 for storing resin pellets 43 and a screw type resin supply device 45 to be driven by a motor. Thus, a constant quantity of the resin pellets 43 can fall in the main flow passage 6a by interconnecting with a controller (not illustrated).

In every injection time, the resin pellets 43 supplied into the main flow passage 6a are fed forward by a reciprocal movement of the piston 9a actuated by a cylinder device 9a, and supplied into the plasticization means 7. Thus, the resin completely melted can be injected into the cavity 1 by way of the gate 4a.

The construction and arranqement of the raw material plasticization means 7, the raw material supply means 8 and the injection plunger means 9 are not limited specifically. An important point of the construction is such that the melted or semimelted resin can be supplied into the main flow passage 6a.

An operation of this embodiment will be referred to hereinafter.

First of all, a desired number of cavities 1 are predetermined. Then, a desired type of the manifold 27 having the number of the heating area 4 which corresponds to that of the gate 4a and the cavity 1 respectively is selected and mounted in the fixed die plate 3a.

Following this step, the resin pellets 43 are supplied into the main flow passage 6a as described previously and flow into a plurality of oblique paths 6b by way of the torpedo 10a. Then, the resin is completely melted in the heating area 4, and injected into the cavities 1 by way of the gates 4a. Thus, injection molding is accomplished and a desired number of molded articles are taken away by opening the movable mold 2.

Further, by actuating intermittently the heater 36 of the pointed heating body 5, the resin cooled and solidified in the gate 4a portion can be heated locally, thereby the gate 4a is opened only at the injection molding time. After the injection molding operation has finished, the gate 4a is always closed, thereby small-sized molded articles can be molded.

Further, by actuating constantly the heater 36 of the pointed heating body 5, it is possible to maintain the resin in the gate portion 4a in a melted or semimelted condition.

Still further, the gate plate 32 may comprise a gate member 32a and a stop plate 32b. The gate member 32b forms the gate 4a and the heating area 4. As shown in FIG. 14, the main components are fixed with each other by a plurality of bolts 31.

According to a remarkable aspect of this invention, a raw material supply means, a raw material plasticization means, an injection plunger means and a melted resin flow passage means are all together incorporated in a mold, thereby a substantial distance from the raw material up to a cavity becomes shorter and an overall construction of the injection molding apparatus becomes small-size and compact.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A small-sized and precision injection molding apparatus, said apparatus characterized by a fixed mold formed with a melted resin flow passage and a raw material plasticization means, said plasitcization means including a melted resin feed chamber for melted resin and said fixed mold provided with an injection plunger member for transporting melted resin from said melted resin feed chamber through said melted resin flow passage, said injection plunger member being disposed in said fixed mold, said melted resin flow passage communicating via a gate to a small-volumed cavity formed between said fixed mold and a movable mold, said raw material plasticization means being connected to a raw material supply means.

2. A small-sized precision injection molding apparatus as claimed in claim 1, in which said melted resin flow passage is in fluid communication with a manifold member removably positioned on said fixed mold, and a main passage of said melted resin flow passage comprises a plurality of oblique paths, each of said oblique paths at an outlet side provided with a small-volumed heating area communicated with a gate.

3. A small-sized and precision injection molding apparatus, said apparatus by a heating body having a pointed end directed to a gate of a small-volumed cavity formed between a movable mold and a fixed mold thereby defining a heating area along said gate, said fixed mold formed with a melted resin flow passage and a raw material, said plasticization means plasticization means including a melted resin feed chamber for melted resin and said fixed mold provided with an injection plunger member for transporting melted resin from said melted resin feed chamber through said melted resin flow passage, said injection plunger member being disposed in said fixed mold, said melted resin flow passage communication via a gate to a small-volumed cavity formed between said fixed mold and a movable mold, said raw material plasticization means being connected with a raw material supply means.

4. A small-sized and precision injection molding apparatus as claimed in claim 3, in which said pointed heating body is provided with a built-in heater for heating and melting resin in the gate area in each injection molding cycle or for keeping resin in the gate area constantly under a semimelted condition.

5. A small-sized precision injection molding apparatus as claimed in claim 3, in which said melted resin flow passage is in fluid communication with a manifold member removably positioned on said fixed mold and a main passage of said melted resin flow passage comprises a plurality of oblique paths, each of said oblique paths at an outlet side provided with a small-volumed heating area communicated with said gate.

6. A small-sized and precision injection molding apparatus as claimed in claim 5, in which said main passage of said manifold means is provided with a torpedo for expediting a melting and kneading effect of the melted resin flowing into each oblique path.

* * * * *